United States Patent
Baker

(10) Patent No.: US 6,199,595 B1
(45) Date of Patent: Mar. 13, 2001

(54) INSULATED MARINE PIPE APPARATUS AND METHOD OF INSTALLATION

(76) Inventor: Jerry G. Baker, 202 Greenwood St., Houma, LA (US) 70364

( * ) Notice: Subject to any disclaimer, the term of this patent is extended or adjusted under 35 U.S.C. 154(b) by 0 days.

(21) Appl. No.: 09/326,037

(22) Filed: Jun. 4, 1999

Related U.S. Application Data

(60) Provisional application No. 60/087,989, filed on Jun. 4, 1998.

(51) Int. Cl.[7] .................................................... F16L 9/14
(52) U.S. Cl. ................................ 138/149; 138/115; 285/47
(58) Field of Search .......................... 138/149, 115, 138/116, 113, 117; 285/47, 45

(56) References Cited

U.S. PATENT DOCUMENTS

| | | | |
|---|---|---|---|
| 2,029,369 | 2/1936 | Halliburton | 138/149 |
| 2,706,496 | 4/1955 | Bond | 138/113 |
| 2,896,669 | 7/1959 | Broadway et al. | 138/113 |
| 2,938,569 | 5/1960 | Goodrich et al. | 138/109 |
| 3,213,889 | 10/1965 | Cotman | 138/113 |
| 3,379,027 | 4/1968 | Mowell et al. | 62/50.7 |
| 3,540,487 | 11/1970 | LoRusso | 138/112 |
| 3,783,907 | 1/1974 | Skinner | 138/106 |
| 3,786,379 | 1/1974 | Lutchansky | 138/113 |
| 3,800,486 | 4/1974 | Harvey | 138/96 R |
| 3,955,601 | 5/1976 | Plummer, III | 138/149 |
| 4,182,378 | 1/1980 | Dieter | 138/112 |
| 4,194,536 | 3/1980 | Stine et al. | 138/149 |
| 4,233,816 | 11/1980 | Hensley | 138/112 X |
| 4,335,267 | 6/1982 | Hopkins | 138/108 X |
| 4,570,680 * | 2/1986 | Ratti | 138/149 |
| 4,590,971 * | 5/1986 | Webster et al. | 138/149 |
| 4,607,665 | 8/1986 | Williams | 138/148 |
| 4,660,861 * | 4/1987 | Argy et al. | 138/149 X |
| 4,896,701 | 1/1990 | Young | 138/108 |
| 4,921,018 * | 5/1990 | Dridi et al. | 138/149 |
| 4,962,826 | 10/1990 | House | 181/207 |
| 5,018,260 | 5/1991 | Ziu | 138/108 X |
| 5,069,255 | 12/1991 | Muszynski | 138/149 |
| 5,183,299 * | 2/1993 | Hallerstorm et al. | 138/149 X |
| 5,400,602 * | 3/1995 | Chang et al. | 138/149 X |
| 5,441,082 | 8/1995 | Eskew et al. | 138/112 |
| 5,458,438 | 10/1995 | Wyke et al. | 138/110 X |
| 5,503,191 | 4/1996 | Morris | 138/111 |
| 5,592,975 | 1/1997 | Wissmann et al. | 138/112 |
| 5,725,028 | 3/1998 | Cleland | 138/149 |
| 5,791,380 | 8/1998 | Onan et al. | 138/149 |
| 5,806,567 * | 9/1998 | Fukui et al. | 138/149 X |
| 5,853,031 * | 12/1998 | De Oliveira | 138/149 |
| 5,934,337 * | 8/1999 | Fiala et al. | 136/149 |
| 5,935,517 * | 8/1999 | Roll et al. | 138/149 X |
| 6,003,559 * | 12/1999 | Baker | 138/149 X |
| 6,068,027 * | 5/2000 | Miller | 138/149 |

* cited by examiner

*Primary Examiner*—Patrick Brinson
(74) *Attorney, Agent, or Firm*—Garvey, Smith, Nehrbass & Doody, L.L.C.

(57) ABSTRACT

A piping system for conveying one or more product flow lines within an outer casing includes insulation members on the product flowline(s) to prevent heat lost and an improved spacer arrangement forming an interface between the product flow lines and the casing to prevent damage to the casing and flow lines as well as reduce friction when the flow lines are pulled through the casing. The insulation members includes a plurality of halves that can be assembled together circumferentially and end-to-end. In one embodiment, a frame carries a U-shaped insulation member that is polymeric and foam filled. The frame is ballasted so that it can be towed to a job site underwater yet buoyant and above the seabed, then lowered onto the pipeline by flooding the ballast tanks.

30 Claims, 13 Drawing Sheets

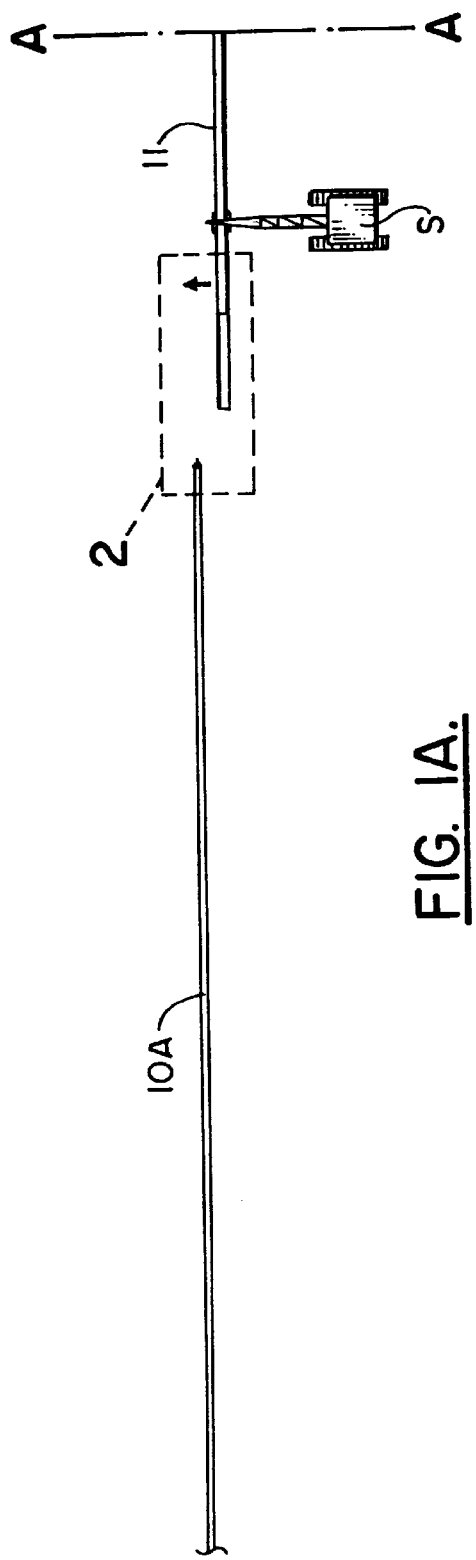
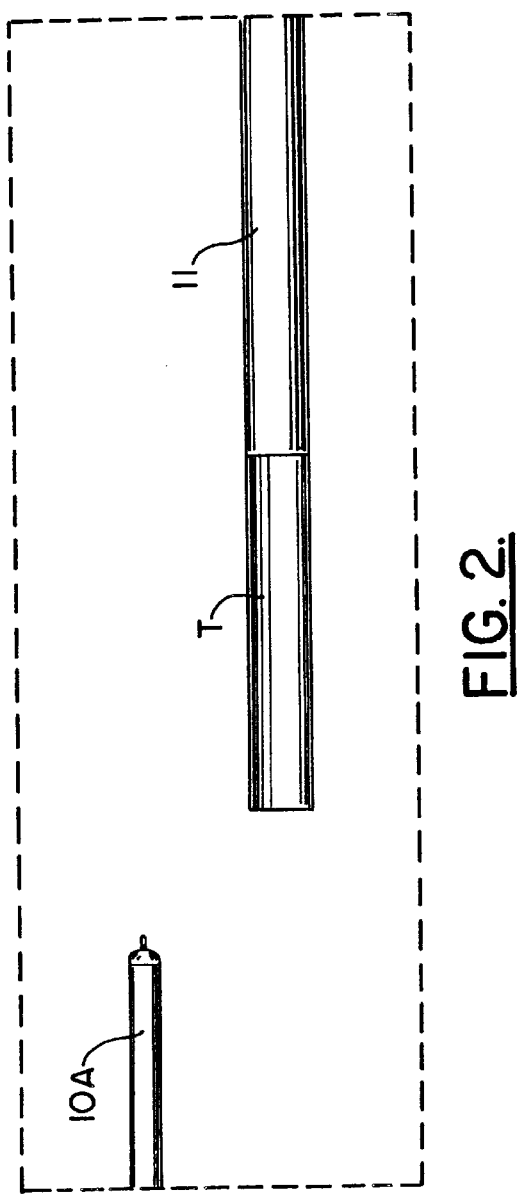
FIG. 1A.
FIG. 2.

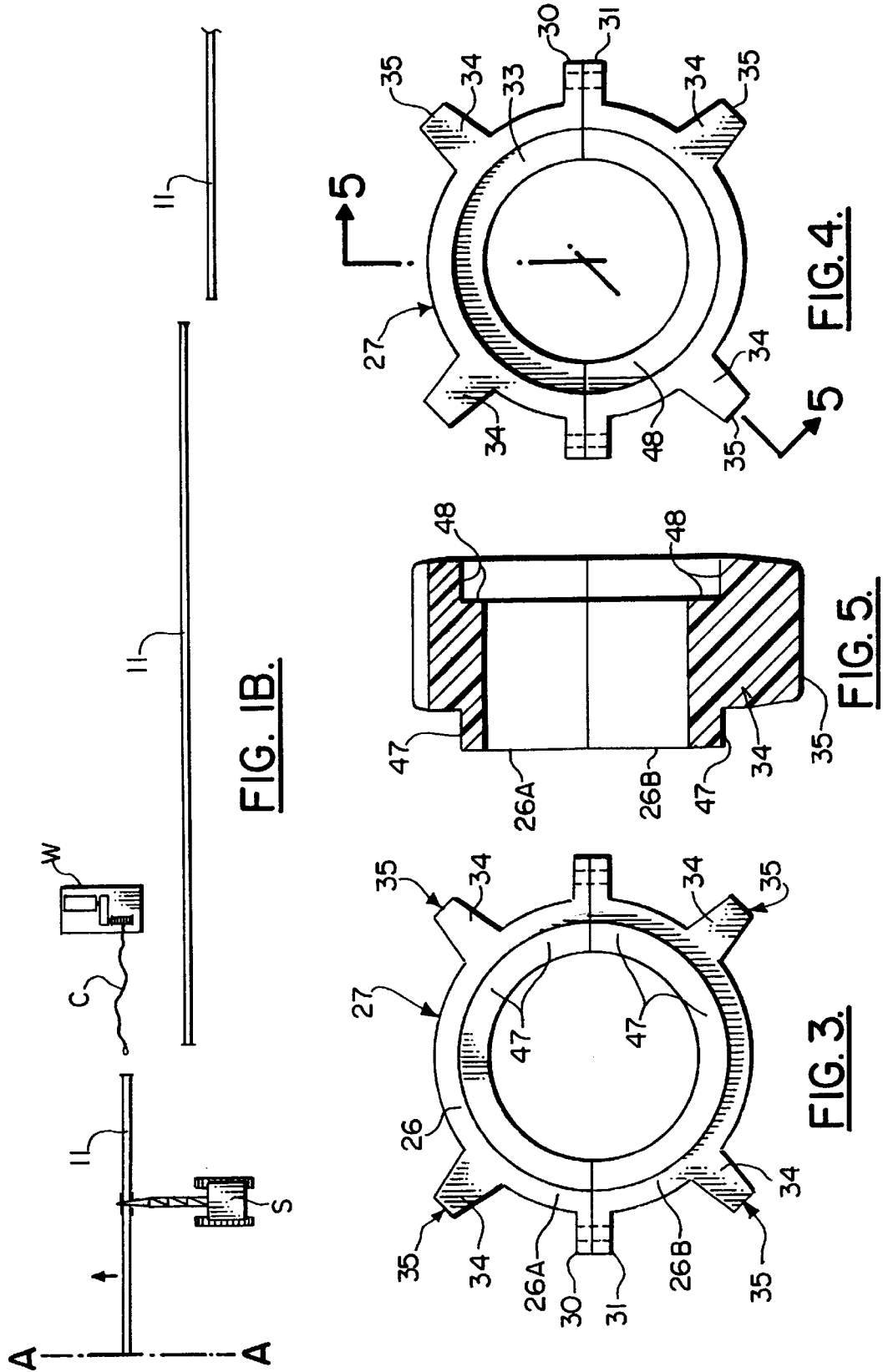

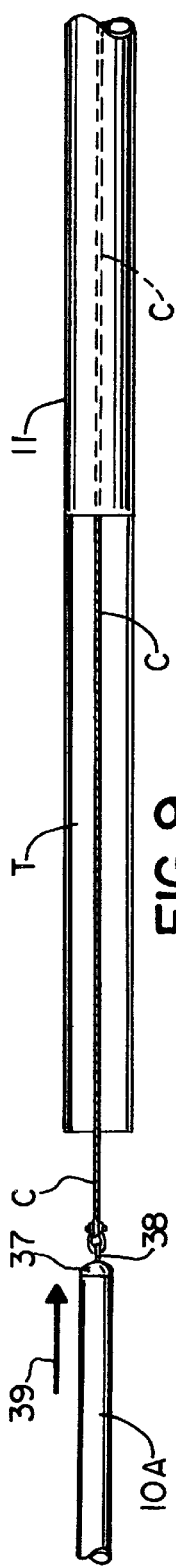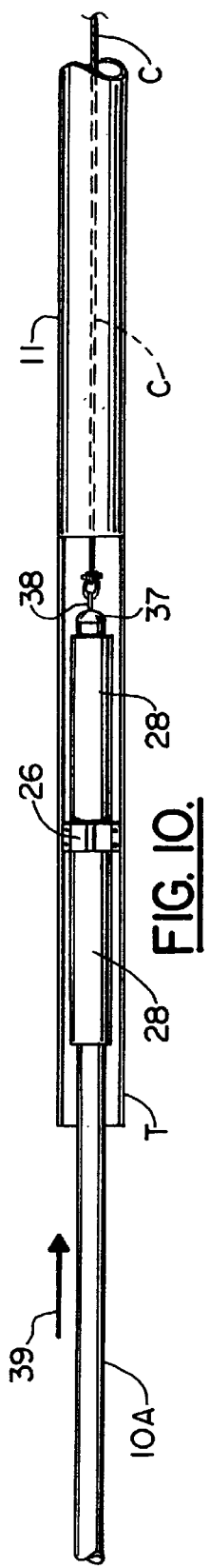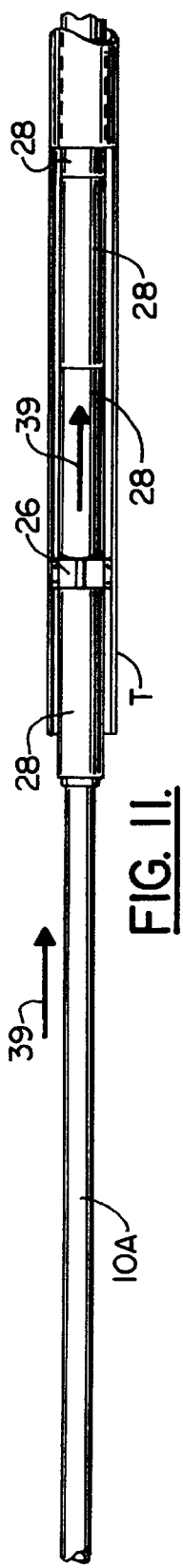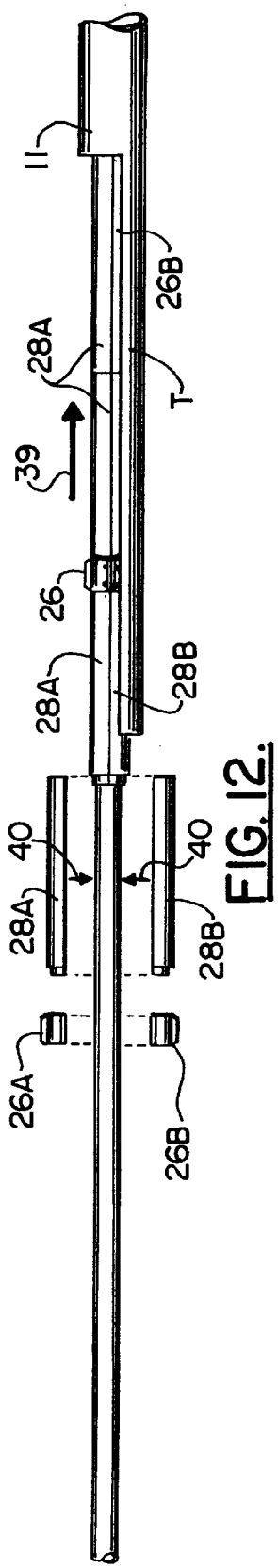

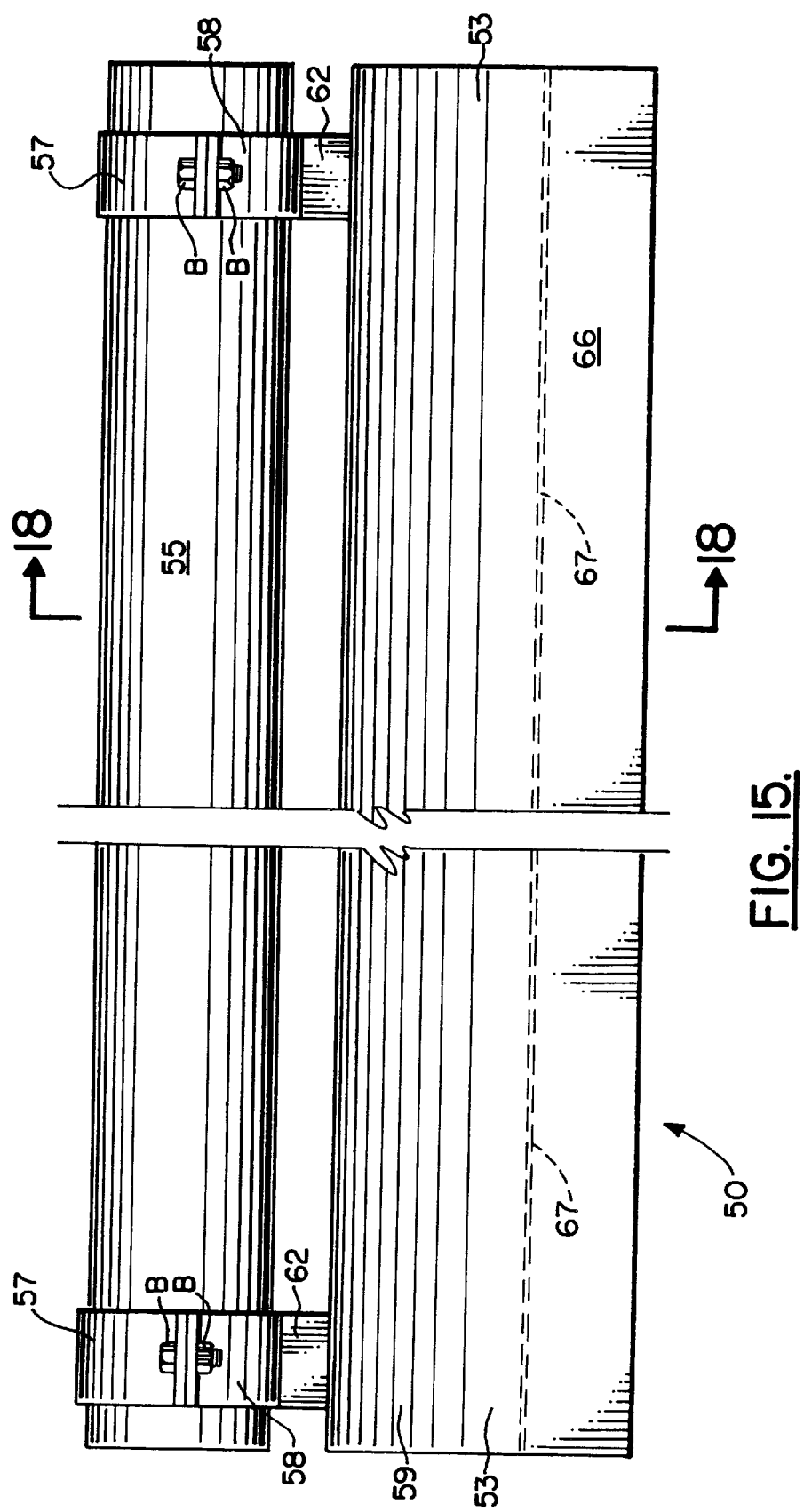

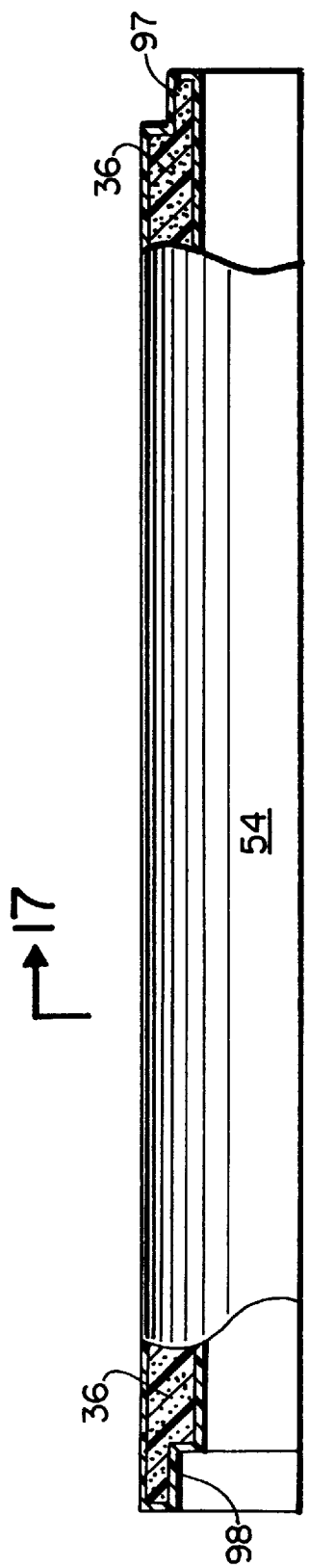
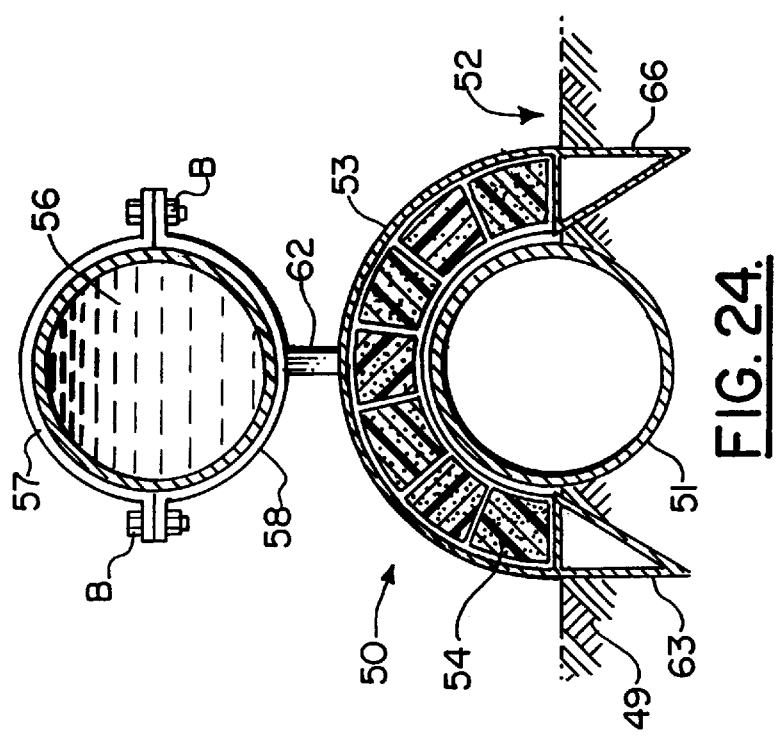
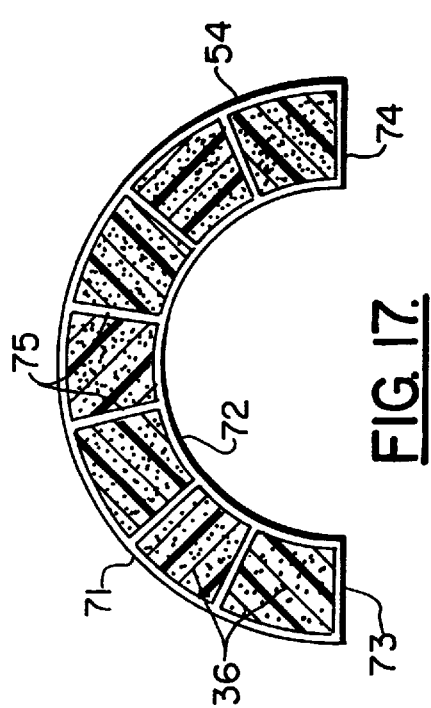

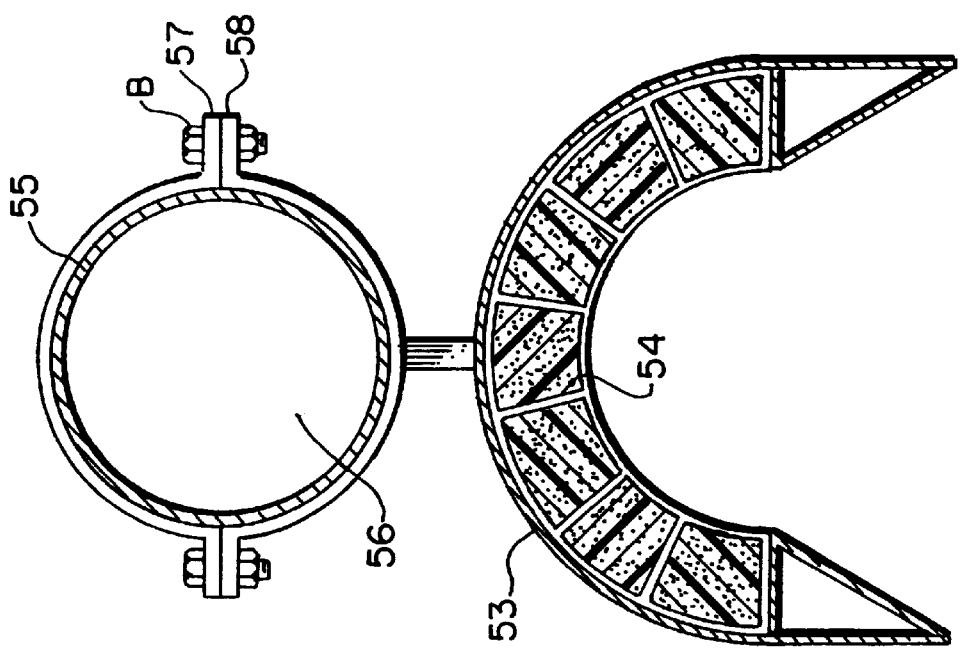
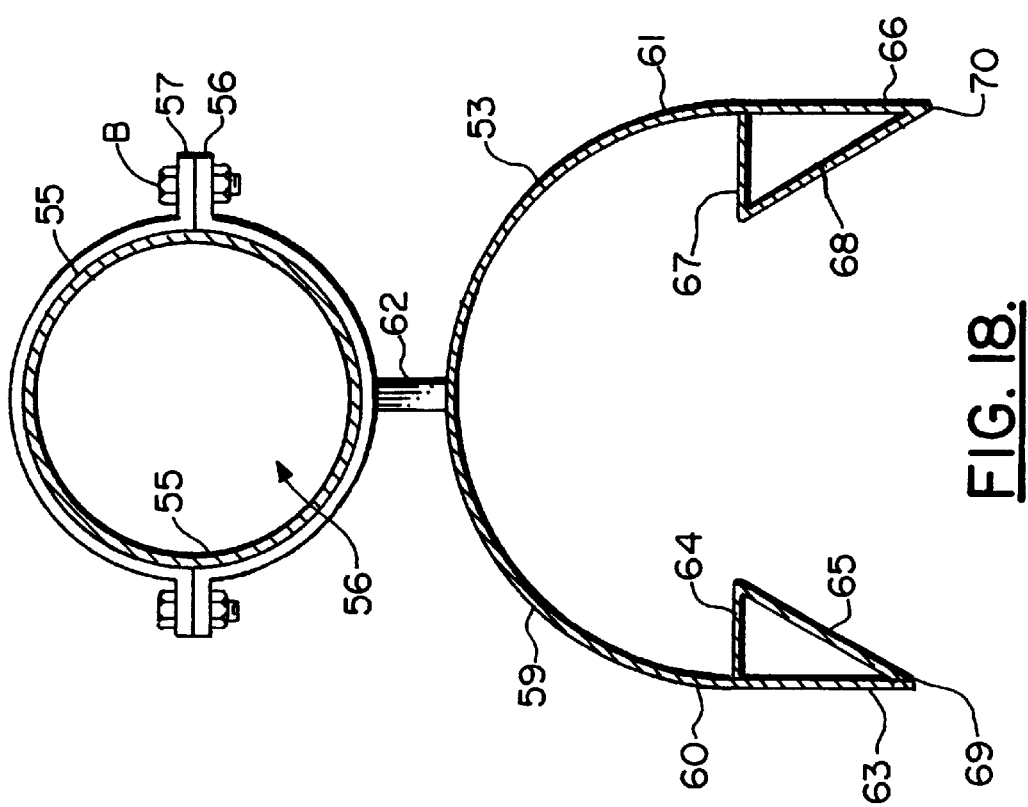

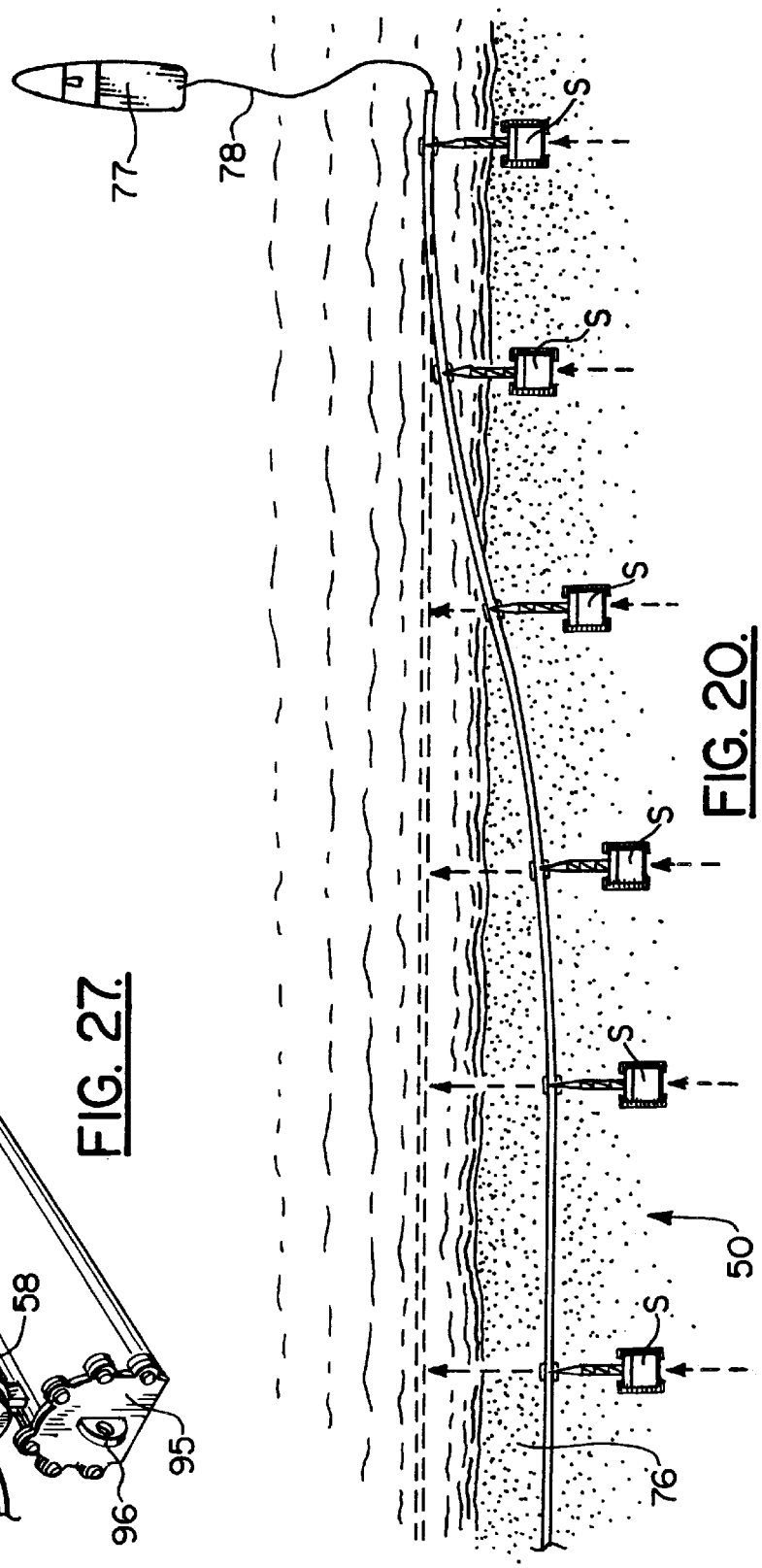

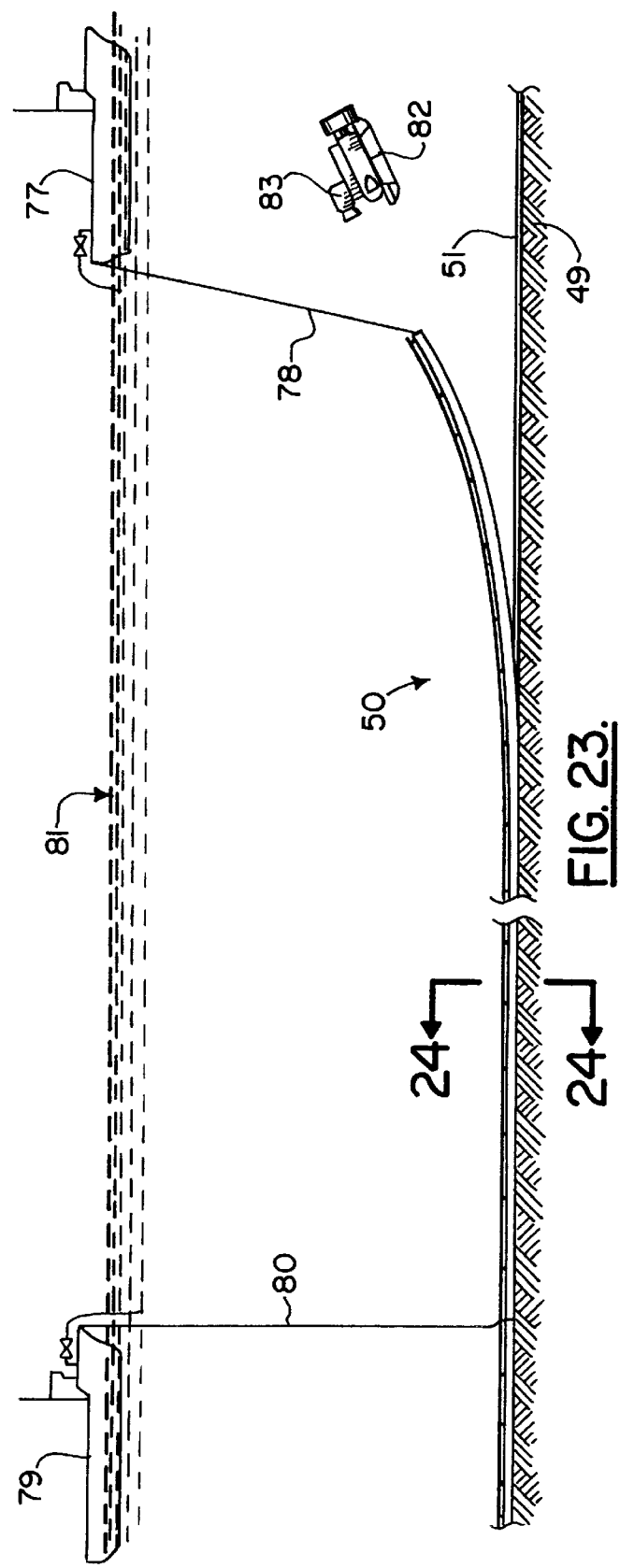

INSULATED MARINE PIPE APPARATUS AND METHOD OF INSTALLATION

CROSS-REFERENCE TO RELATED APPLICATIONS

Priority of U.S. Provisional Patent Application Ser. No. 60/087,989, filed Jun. 4, 1998, incorporated herein by reference, is hereby claimed.

U.S. patent application Ser. No. 09/057,843, filed Apr. 9, 1998, is incorporated herein by reference.

U.S. Provisional Patent Application Ser. No. 60/056,227, filed Aug. 21, 1997, is incorporated herein by reference.

U.S. Provisional Patent Application Ser. No. 60/087,989, filed Jun. 4, 1998, is incorporated herein by reference.

Disclosure Document No. 411,183, filed Jan. 21, 1997, is hereby incorporated by reference. In accordance with M.P.E.P. Section 1706, please retain Disclosure Document No. 411,183, filed Jan. 21, 1997 and entitled "PIPE WITHIN A PIPE FLOWLINE BUNDLE SPACER".

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to marine piping and piping assemblies, and more particularly to an assembly that includes an outer casing with one or more smaller insulated flow lines disposed within the outer casing and a plurality of foam filled shell insulation members and spacers positioned along the flow lines at intervals, the spacers being configured to enable the product flow lines to be pulled through the outer casing during placement. The shell insulation members include polymeric material that encapsulates the foam, isolating it from the surrounding marine environment.

2. General Background of the Invention

With the advent of deep-water hydrocarbon production from depths exceeding 3,000 feet below mean seal level (msl) one of the methods for installing production flow lines has been to install one or more production flow lines inside an outer carrier or casing pipe. The casing pipe and flow line(s) are pre-welded in long lengths and then the flow line(s) are pulled into the casing pipe by means of a pull winch. The flow line(s) normally has a rigid polyisocyanurite insulation jacket complete encircling the line to keep the hydrocarbon from losing heat. This insulation must be protected from dragging against the casing or it will become torn, dismembered, or ruptured. The insulation jacket must fit snugly against the spacer and sealed in order not to allow heat transfer to take place.

This type of insulated pull-in piping segments are used in both the bottom tow flow line bundle method for installing long land fabricated cased flow line bundle segments that are towed on the ocean bottom to their final installation point and the reel barge method of laying cased flow lines segments that are put together on land, reeled onto the spool barge and then unreeled at the final installation point.

Since this is relatively new technology there have been very few previous projects in the scope of this invention. Previous approaches have required spacers on land and marine cased crossings to use numerous thin short pull spacers to be placed 5–7 feet apart. These spacers were designed to withstand minimal drag and pressure to be exerted on the part and were used to pull a short section of flow line 300 feet or less into a casing pipe.

Several patents have issued that disclosed generally the concept of disposing one pipe or conduit inside of another and wherein spacers form an interface between the inner and outer pipes. The Bond U.S. Pat. No. 2,706,496 discloses a concentric pipe insulator and spacer that includes a plurality of longitudinally extending ribs connected with cable, each of the ribs providing two spaced apart rollers that are provided to contact an outer casing.

In the Cotman U.S. Pat. No. 3,213,889, there is provided a pipe support in the form of a collar that surrounds an inner pipe disposed within an outer pipe.

The Mowell U.S. Pat. No. 3,379,027 discloses a roller supported LNG pipeline that includes an inner pipe having a plurality of rollers extending from the outer surface thereof and wherein the rollers contact the inner wall of an outer casing.

In the Lutchansky U.S. Pat. No. 3,786,379, there is provided a wave-guide structure that utilizes roller spring supports for supporting a waveguide in a conduit to simultaneously provide a compliance support and allow free relative longitudinal movement between the waveguide and the conduit. A tension band having a plurality of spring assemblies integrally formed therewith is fastened about eh periphery of the waveguide. Rollers are mounted on the spring assemblies in contact with the conduit to allow free relative longitudinal movement of the waveguide and conduit. The spring assemblies provide a soft compliant support through a range of deflections accommodating the worst expected thermal loading conditions in route bends. Under higher loading the spring assemblies bottom out and provide a stiff support to prevent further radial deflection of the waveguide with respect to the conduit.

A cryogenic fluid transfer line is provided in U.S. Pat. No. 4,233,816 which comprises an interior conduit for passage therethrough of cryogenic fluid, an exterior conduit concentrically spaced about the interior conduit and defining the exterior of the fluid transfer line, an annular heat transfer shield generally concentric with and interjacent to the interior and exterior conduits and including at least one longitudinally extending resilient arcuate member with a longitudinally extending generally arcuate hooking edge, at least one longitudinally extending resilient arcuate member with a longitudinally extending generally arcuate catching edge, where the hooking and catching edge members are interlockingly engageable with each other when the member including the hooking edge is flexed to a smaller arcuate radius, positioned with its hooking edge inboard of the catching edge and then permitted to relax, each set of engaged hooking and catching edges defining a hollow generally cylindrical next having a substantially closed curved surface with each next extending longitudinally substantially the length of the shield, with the shield further including longitudinally extending heat transfer conduits resident within each nest. Radiation shields are provided between the annular heat transfer shield and the interior and exterior conduits.

An underground pipe support device is the subject of U.S. Pat. No. 4,896,701 for supporting an underground pipe or cable within the encasement sleeve of a horizontally bored hole. The support device includes a round collar having two resiliently spaced-apart ends which can be urged together to secure the device to the underground pipe or cable. A plurality of equidistantly spaced-apart and outwardly extending support legs are provided around the circumference of the collar which terminate in an elongate foot having opposing ends inclined inwardly toward the collar. Each foot extends generally parallel to the longitudinal axis of the collar and has a greater length than the longitudinal length of the collar to facilitate placement and support of an underground pipe or conduit within the encasement sleeve of the underground hole.

The Muszynski U.S. Pat. No. 5,069,255 discloses a pipeline casing insulator to support a coated pipe within a tubular metallic casing. The pipeline casing insulator comprises a flexible belt formed of a material that is capable of bonding to an organic resin. A plurality of parallel bar-like runners are formed from an insulative and non-abrasive polymer concrete that is cast onto an outer facing surface of the belt. The belt is preferably a strip of an organic non-woven material. The polymer concrete is preferably a mixture of a thermosetting polymer resin, such as epoxy, polyester or polyurethane, and an aggregate. The aggregate preferably comprises a mixture of substantially incompressible coarse particulate material, such as sand or gravel, and fine filler material, such as calcium carbonate, silica flour, or kaolin. The inner facing surface of the belt preferably has a mastic coating covered by a release paper that can be removed, to allow attachment of the belt to the outer surface of the pipe by circumferentially wrapping the belt around the pipe.

A casing spacer that includes first and second elongated, steel shell members is disclosed in the Eskew U.S. Pat. No. 5,441,082. The casing spacer is comprised of stainless steel or high strength steel with corrosion inhibiting coatings, with each shell member having a semi-circular cross section for engaging and enclosing a carrier pipe within an outer casing. Attached to the outer surface of each of the first and second shell members are one or more adjustable risers for engaging the inner surface of the casing in maintaining the pipe, or pipes, in fixed position within the casing. Each riser includes a runner on its distal end to facilitate positioning of the spacer within the casing. The casing spacer's first and second shell members are securely coupled together by way of flange and nut and bolt combinations along one edge and a hook and eye arrangement along a second, opposed edge. The hook portion of one shell member is easily inserted in the eye portion of the second shell member followed by tightening of the nut and bolt combinations allowing a single worker to easily and quickly install the spacer about a carrier pipe and within a casing.

In the Morris U.S. Pat. No. 5,503,191 a length of elongate material such as rubber hose is supported and guided while being fed along a desired path of travel that extends through the hollow interior of a tubular structure. The tubular structure mounts an array of relatively closely spaced rollers that project into the hollow interior to guide and support the moving length of material. The tubular structure is formed as a "tube within a tube" assembly of "inner" and "outer" tubular members that closely interfit, and that sandwich roller support pins between overlying portions of the inner and outer tubular members. The roller support pins bridge roller positioning holes that are formed through the inner tubular member at an array of spaced locations. The rollers are rotatably mounted by the support pins and project through the positioning holes into the hollow interior of the tubular structure to engage outer surface portions of such elongate material as is being fed through the tubular structure to prevent the moving material from contacting stationary portions of the tubular structure. In preferred practice, a funnel-like roller-carrying end assembly is provided near one end of the tubular structure to define a constricted discharge opening through which the moving material discharges.

A glide tube ring for tube-in-tube systems is disclosed in U.S. Pat. No. 5,592,975. The glide ring tube according to the invention is provided with axially spaced glides running parallel to each other whose material has the lowest possible friction coefficient, especially a plastic, preferably a fiberglass-reinforced polyethylene, polyamide or the like, in which the glide tube ring is attached to the central tube forming a closed ring that centers this tube in the protecting tube, pipe conduit or the like.

BRIEF SUMMARY OF THE INVENTION

The present invention addresses the aforementioned problems encountered in the prior art by providing a flow line(s) spacer/centralizer which is manufactured to adjoin the insulating jacket, protect the insulation from the casing pipe, act as a dragging surface for the installation of the flow line(s) inside the casing for longer sections, allow multiple flow lines of various sizes to be bundled and inserted at the same time, by adding wheels to replace the ear section on the spacer body allowing the installation contractor to pull longer sections with fewer sectional tie-in welds on both the flow line(s) and casing thereby speeding up the installation time and reducing cost. The present invention requires only one spacer per 40-foot pipe joint to be installed, saving labor, speeding installation and lowering cost.

The present invention thus provides an improved piping assembly having an outer casing with an annular containment space for holding one or more product flow lines, the casing having a bore and an inner wall portion surrounding the bore.

One or more product flow lines is surrounded by insulation and positioned within the outer casing, the insulation having a generally cylindrically-shaped outer surface that has a diameter smaller than the diameter of the casing bore.

A plurality of spacers are positioned along the flow lines at intervals, each spacer having projecting portions for engaging the inner wall of the casing or having the proper full body diameter to contact the inner wall of the casing when the product flow lines are pulled through the casing. In small pipe-in-pipe bundles where tolerances are very close (±0.125 inch) there is no space for an ear section. For example, a 6"×10" centralizer with 1.5" body thickness may not have ears.

Each spacer includes a pair of halves that can be assembled together about the flow line, each half being an integral member that includes a body, flanged portions, and optionally projecting portions with drag surfaces thereon.

Each of the halves includes corresponding flanged portions that abut face-to-face upon assembly of the halves. A bolted connection is used for example to assemble the halves together at the flanged portions. Alternatively, bolts may go through the body of the spacer itself.

The projecting portions extend longitudinally and radially with respect to the central axis of the flow line. Each half has at least a pair of projecting portions thereon. Each half has annular shoulder fore and aft that mate with adjacent insulation to avoid heat loss.

A layer of insulation can be provided that surrounds the flow line. The insulating barrier can be a ceramic latex paint put on the outside surface of the product flow line.

Insulation for the flow lines can include a first layer of insulation of foam, and second and third layers of insulation that surround the flow line and the foam, the second and third layers being metallic foil layers.

The inside diameter of the outer casing pipe can be coated with an insulating barrier such as a ceramic latex paint that will enhance the reflective capacity of the outer casing pipe to prevent the colder temperatures from entering the casing, thereby allowing more heat to stay inside the product flowline area.

The insulation can be in the form of a hollow shell of polymeric material such as high density polypropylene, nylon or the like. This shell is sealed about an inner insulating material such as foam. The outer polymeric shell prevents attack of the foam by surrounding sea water and the marine environment by surrounding the foam with the impervious plastic polymeric material.

In one embodiment, the shelled insulation material is in the form of a plurality of sections that can be interlocked together. For example, in one embodiment, the shells are in the form of semicircular sections that are longitudinally extending. Mating faces of the shells interlock longitudinally. Male and female projecting end portions of the shell insulation members can then be connected end to end. Correspondingly shaped spacers can be placed at intervals to form a connection with the insulation members and to space the pipe from the outer casing.

In another embodiment, the shell is in the form of a semicircular insulation member that is carried by a frame having a U-shaped member with spaced apart side walls that straddle the pipe. In this embodiment, the semicircular insulation member conforms to the pipe. The frame extends over the pipe and covers it even when the pipe is embedded in the seabed at or below the mud line. The insulation member can be supported by ballast pipes that enable it to be towed to a job site about midway between the water surface and the seabed if desired. The ballasting material can then lower the apparatus to the seabed where it can engage and insulate a pipe that is an existing flowline on the seabed.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIGS. 1A and 1B are schematic match line plan views illustrating a part of the method of the present invention;

FIG. 2 is a fragmentary plan view illustrating part of the method of the present invention;

FIG. 3 is a fragmentary end view of the preferred embodiment of the apparatus of the present invention showing the spacer;

FIG. 4 is another fragmentary end view of the preferred embodiment of the apparatus of the present invention showing the spacer;

FIG. 5 is a sectional view taken along lines 5—5 of FIG. 4;

FIGS. 9–12 are schematic views illustrating part of the method of the present invention;

FIG. 15 is a side, elevational view of a second embodiment of the apparatus of the present invention;

FIG. 16 is a partial elevational view of the second embodiment of the apparatus of the present invention showing the insulation member;

FIG. 17 is a sectional view taken along lines 17—17 of FIG. 16;

FIG. 18 is a partial end view of the second embodiment of the apparatus of the present invention;

FIG. 19 is a partial end, sectional view of the second embodiment of the apparatus of the present invention;

FIG. 20 is a plan view illustrating the method of the present invention;

FIG. 23 is a side elevational view illustrating the method of the present invention;

FIG. 24 is a transverse sectional view of the second embodiment of the apparatus of the present invention shown in position on a pipeline located on a seabed;

DETAILED DESCRIPTION OF THE INVENTION

Figure 1:
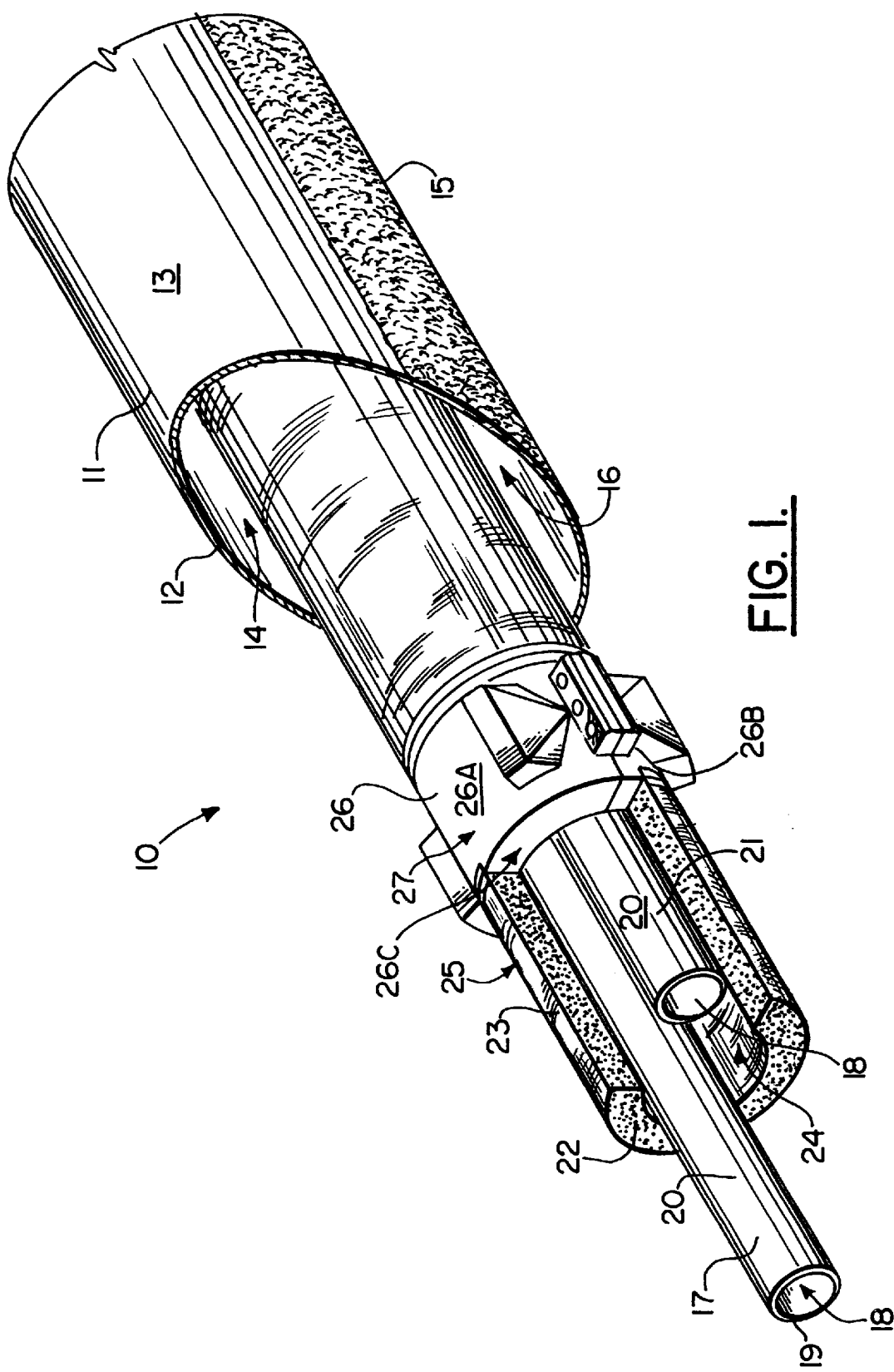
FIG. 1 is a perspective view of the preferred embodiment of the apparatus of the present invention.

In FIGS. 1, 1A and 1B, there can be shown the initial part of the method of the present invention wherein match line A—A of FIG. 1A matches line A—A of FIG. 1B. An inner pipe assembly 10A is constructed of multiple lengths of pipe welded together end to end. The inner pipe assembly 10A is pulled into an outer pipe or casing 11, beginning at trough T of casing 11 (see FIGS. 2 and 9–12). Inner pipe assembly 11 includes a weld cap 37 with a padeye 38 to which cable C is attached.

Side booms or like pipe handling equipment can be used to preliminarily position casing sections 11. A number of lengths of casing 11 can then be assembled (eg. welded) end to end. Inner pipe assembly 10A is pulled into casing 11 using commercially available pulling equipment such as the winch W and winch cable C in FIG. 1B.

In FIGS. 9–12, the method of the present invention shows the preliminary step of connecting cable C to inner pipe member 10A at weld cap 37 and padeye 38. Cable C is pulled by winch W in the direction of arrow 39 pulling inner pipe member 10A into the bore 16 of casing 11. As the inner pipe 10A is pulled in the direction of arrow 39, shell halves 28A, 28B are added to the inner pipe 10A. Additionally, spacer halves 26A, 26B are added as shown in FIG. 12. The arrows 40 in FIG. 12 indicate the assembly of spacer halves 26A, 26B and shell halves 28A, 28B to pipe 10A. In FIGS. 10–12, the assembled inner pipe member 10A is covered with a plurality of shells 28 with spacers 26 positioned at intervals.

FIG. 1 shows generally a first embodiment of the apparatus of the present invention designated by the numeral 10 in FIG. 1. Piping assembly 10 includes an outer casing 11 having a generally cylindrically-shaped wall 12. Wall 12 provides an outer surface 13 and an inner surface 14, both generally cylindrically shaped.

Casing 11 can have a drag coating surface 15 so that it can be pulled during installation across a seabed, for example. Casing 11 has a hollow bore or annular containment space 16 for containing an inner pipe assembly 10A that can include one or more product flow lines 17, 21. The inner pipe assembly 10A includes one or more inner metallic pipe member 17, each having a bore 18 and covered with a coating. The product flow line 17 has a longitudinally extending flow bore 18 that is surrounded by cylindrically-shaped wall 19 having an outer cylindrically-shaped surface 20. Similarly, the product flow line 21 has flow bore 18, wall 19, and outer surface 20.

The two product flow lines 17, 21 can be surrounded by preferably three layers of insulation. This includes a first thickest insulation layer 22 that can be of polymeric foam, for example. On the outer surface of insulation layer 22, there is provided outer foil layer 23 that is also an insulating layer, being of a foil metallic material. Inner foil layer 24 provides another insulating layer in between the flow lines 17, 21 and foam insulation layer 22. Ceramic latex paint can be applied to the outer surface 20 of the two product flow lines 17, 21 to add another insulating layer.

A plurality of spacer bodies 26 are disposed at intervals along the flow lines 17, 21 (e.g., one per 40' joint of pipe). In between two successive spacer bodies 26, the insulation 22, 23, 24 is provided. Each spacer has fore and aft annular shoulders 26C that mate with the adjacent insulation 22, 23, 24 to eliminate heat loss. This provides an outer cylindrical surface 25 of the insulation layers 22, 23, 24 that is correspondingly configured to mate with an outer cylindrical surface 27 of the spacer bodies 26 as shown in FIG. 1.

Each spacer body 26 is formed of a pair of spacer halves 26A, 26B. Each of the spacer halves 26A, 26B provides respective flange portions 30, 31. These flanges enable the spacer halves 26A, 26B to be bolted together using bolted connections B.

The outer surface 27 of spacer body 26 provides a plurality of projecting portions 34. Each projecting portion 34 provides a drag surface 35 that engages the inner surface 14 of casing 11 as the assembly of flow lines 17, 21, insulation layers 22, 23, 24, and spacers 26 is pulled through annular containment space or bore 16 of casing 11. The opposing ends 32, 33 of each spacer 26 provide respective male and female ends 32, 33 that connect to correspondingly shaped end portions of insulation members.

A second embodiment of the present invention provides a shell and foam insulation system that is shown in FIGS. 6–14 and that works in concert with the spacers 26 of FIGS. 1 and 3–5. In FIGS. 6–7, and 13–14, insulation member 28 includes a plurality of connected hollow shells 29 provided with a central bore 37 preferably preformed to the O.D. of the pipe it is to surround, in the case of I.D. insulation or cover (half shell) on O.D. covering. Once the complete plastic shell 29 is made in the proper I.D. and O.D. it is filled with polymeric foam 36 of the proper density. One determines the proper density of the foam 36 to be used by determining the K-value (insulation value) desired based on flowline operating temperature and outside temperature. K-value is an expression of heat transfer(BTU/FT2Hr° F.). The normal range for a pipe bundle is approximately 28 or lower.

For pressures up to 1500 PSI the shell 28 is preferably formed of High Density Polyethylene (HDPE). For pressures above that the shell can be formed of Nylon. The wall thickness on the shell 29 can be varied to compensate for pressure.

As water depth increases, the pressure on the insulation increases. The pressure in p.s.i. is approximately ½ of the water depth in feet(3,000 ft. below sea level=1,500 psi). This pressure can potentially cause insulation to compress, contort and/or crack.

A foam 36 encapsulating plastic shell 29 of HDPE (high density polyethylene), polypropylene or any engineering rosin, for extreme pressures, can be made to withstand pressures and keeps polyurethane foam 36 intact.

The foam encapsulating shell 29 is preferably preformed to the desired thickness, length and diameter in a half shell form, leaving PU foam fill holes (not shown) in one end. The form is filled with the applicable density foam 36 and the holes are plugged. For inside bundle use the preformed shell halves 29 are aligned around the pipe(s) with male projections and female grooves connecting as shown in FIGS. 6, 9–12, 14. Bands (not shown) can be placed around the two halves 28A, 28B to form a complete shell insulation member 28.

Figure 6:
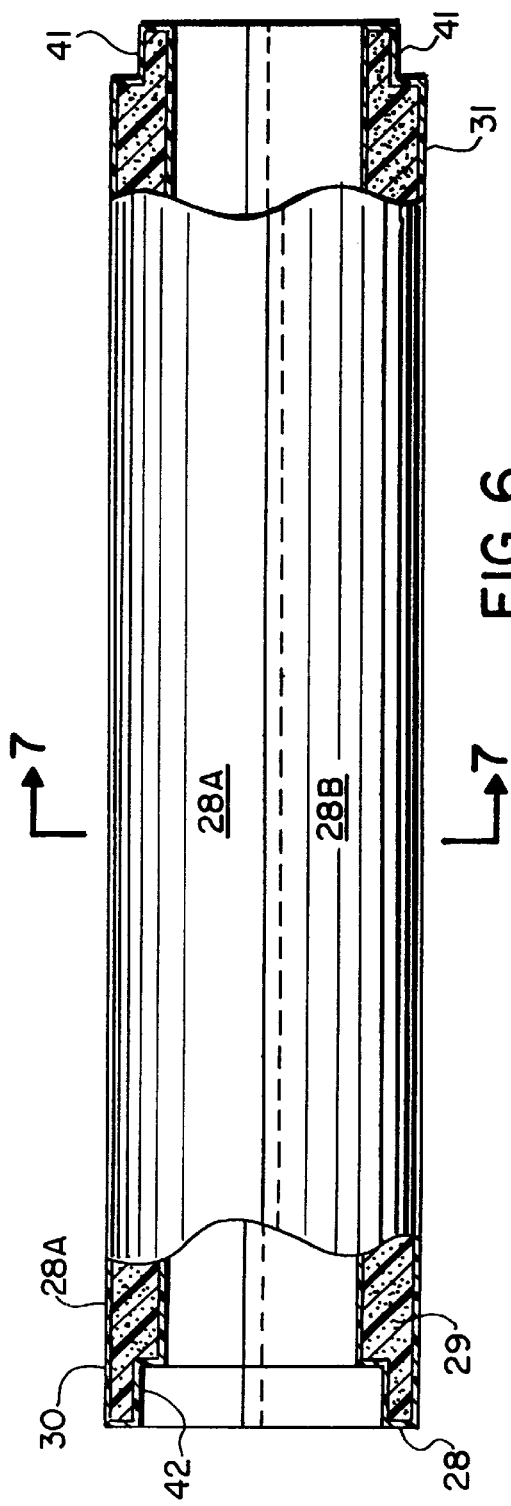
FIG. 6 is a fragmentary side, elevational, partially cut away view of the preferred embodiment of the apparatus of the present invention showing the insulation members.
Figure 8:
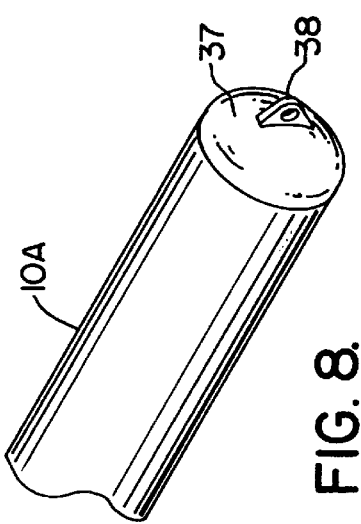
FIG. 8 is a fragmentary view of the preferred embodiment of the apparatus of the present invention showing the inner pipe, weld cap and padeye.
Figure 7:
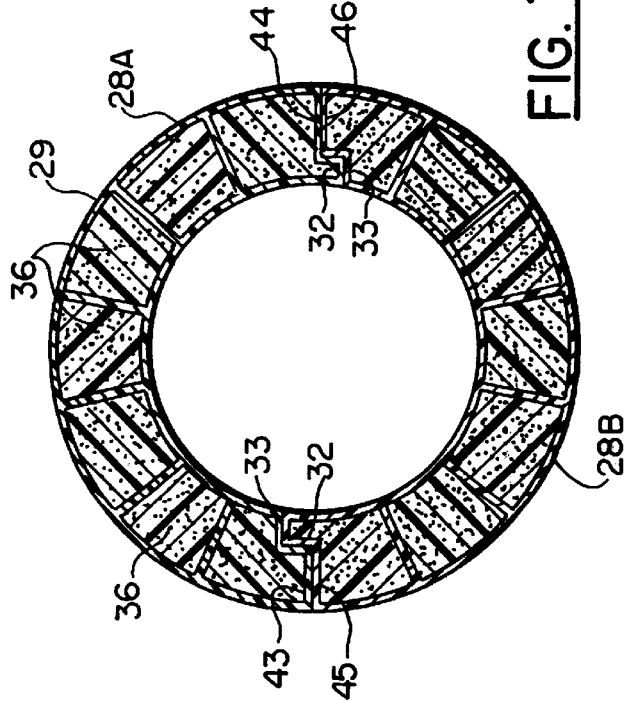
FIG. 7 is a sectional view taken along lines 7—7 of FIG. 6.
Figure 13:
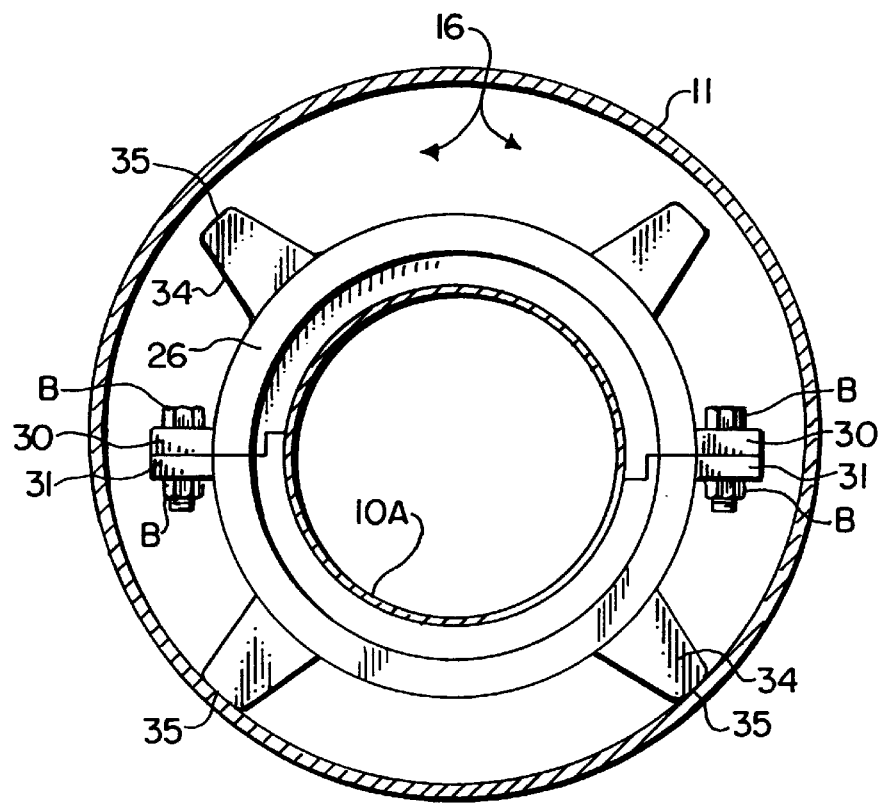
FIG. 13 is a partial end view of the preferred embodiment of the apparatus of the present invention showing the inner pipe, spacer and outer casing.

FIGS. 3, 4, 6–7, 13 and 14, it can be seen that a pair of shell halves 28A, 28B assemble together at longitudinally extending mating faces 43, 44 of shell half 28A that engage correspondingly shaped mating faces 45, 46 of shell half 28B (see FIG. 7). The mating faces 43, 46 provide grooves 33 that form a connection with projecting portions 32 of the mating faces 44 and 45. Thus, a tongue and groove type longitudinally extending connection is formed between an upper shell half 28A and a lower shell half 28B as shown in FIG. 7.

Figure 14:
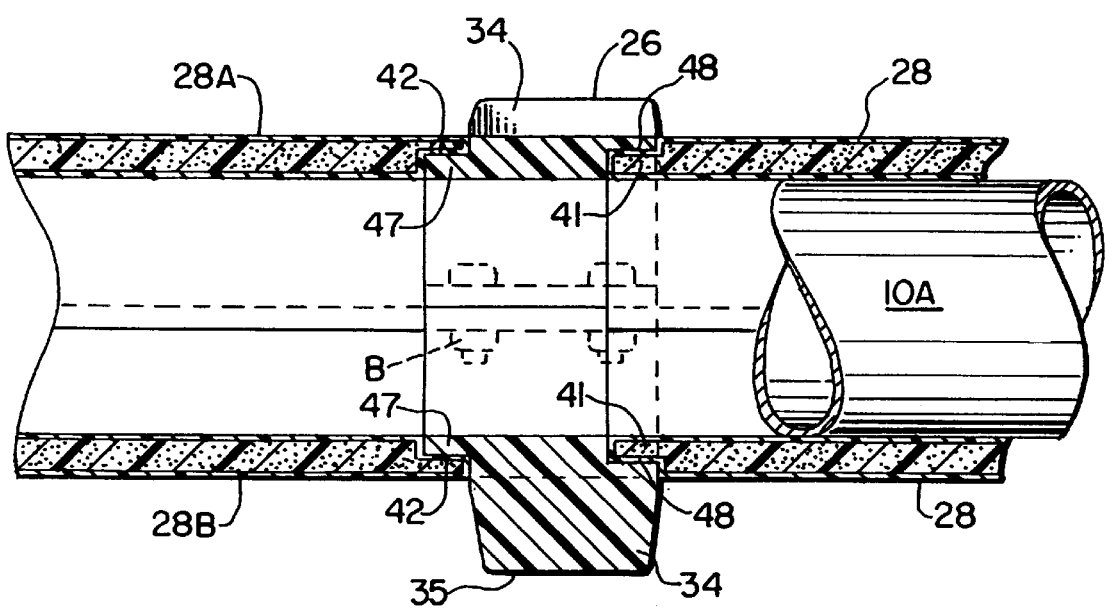
FIG. 14 is a partial sectional, elevational view of the preferred embodiment of the apparatus of the present invention.
Figure 22:
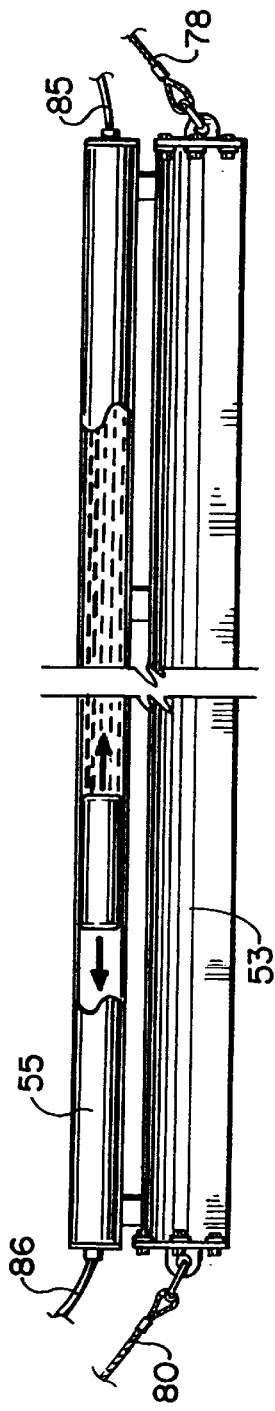
FIG. 22 is a partial side elevational view of the second embodiment of the apparatus of the present invention.

The shell halves 28A, 28B also form connections end to end with other shell halves 28A, 28B and with spacers 26 as shown in FIGS. 6, 9–12 and 14. In FIGS. 6 and 14, the male connecting end 41 of an assembled shell 28 (including halves 28A, 28B) forms a connection with a female connecting end 42 of the next insulation member 28. A number of such insulation members 28 can be connected end to end as shown in FIGS. 11 and 12.

At intervals, a spacer 26 is placed in connection end-to-end with two insulation shell members 28. In FIG. 14, the male connecting end 47 of spacer 26 forms a connection with the female connecting end 42 of shell 28. Similarly, the female connecting end 48 of spacer 26 forms a connection with the male connecting end 41 of insulation member 28.

For outside use on existing flowlines laid on the ocean bottom exposed, a preformed shell (see FIGS. 15–27) is made to fit the O.D. of the pipe to be insulated. The half shells are jointed to the desired length, by bolting sections together and installing bolts in the preformed holes in the end of each section. The proper weight is calculated needed to hold the half shell section on the bottom around the pipe and a concrete or similar half shell saddle is made to fit over the insulation section.

The embodiment of FIGS. 15–27 provides a pipe and insulation apparatus designated generally by the numeral 50 in FIGS. 15 and 24. Pipe and insulation apparatus 50 includes a frame 53 that carries insulation shell members 54. The frame 53 and its carried insulation shell members 54 can be used to cover a pipeline 50 that is on the seabed 49, even if the pipeline 51 is partially below mud line 52.

Frame 53 provides a ballast pipe 55 having an interior ballast chamber 56. A "pig" or seal member 86 can be provided in ballast tank 55 chamber 56 to ensure full emptying and full filling. Clamps 57, 58 can be bolted together for securing ballast pipe 55 to frame 53 at strut 62. The frame 53 includes a U-shaped member 59 having opposed side walls 60, 61.

The side wall 60 carries an appendage 63 that is longitudinally extending and generally triangularly shaped as shown in FIG. 18. The appendage 63 includes a transverse plate member 64 and a diagonally extending plate member 65. Similarly, an appendage 66 is carried by sidewall 61. The appendage 66 includes plate member 67 and plate member 68. Thus the appendage 66 is also generally triangularly shaped in transverse section. The appendages 63, 66 function to support insulation member 54 and position against U-shaped member 59 as shown in FIGS. 19 and 24. The diagonally extending plates 65, 68 form an angled surface that helps center frame 53 on pipe 51 as shown in FIG. 24. Additionally, each of the appendages 63, 66 provides a pointed end portion 69, 70 respectively that engage the seabed 49 when the apparatus 50 is in operating position as shown in FIG. 24.

In FIG. 17, insulation member 54 is in the form of a plastic, polymeric shell such as polyethylene or nylon. The shell 54 provides an outer shell member 71 that is curved in an inner curved shell member 72 that engages pipe 51. A pair of flat shell surfaces 73, 74 are respectively positioned next to transverse plates 64, 67 of frame 53 as shown in FIG. 19 upon assembly. The shell 54 includes a plurality of stiffeners or baffles 75 that are radially extending and circumferentially spaced. A foam filler 36 is placed within and surrounded by the shell members 71, 72, 73, 74 as shown in FIG. 17. This prevents pressure and the surrounding environment from accessing the foam 36 thus preventing its failure in use. Male and female end portions 97, 98 respectively enable a plurality of insulation members to be connected end to end, with the male end portion 97 engaging the female end portion 98 so that the overlapping joint between each member 54 insulates.

Figure 21:
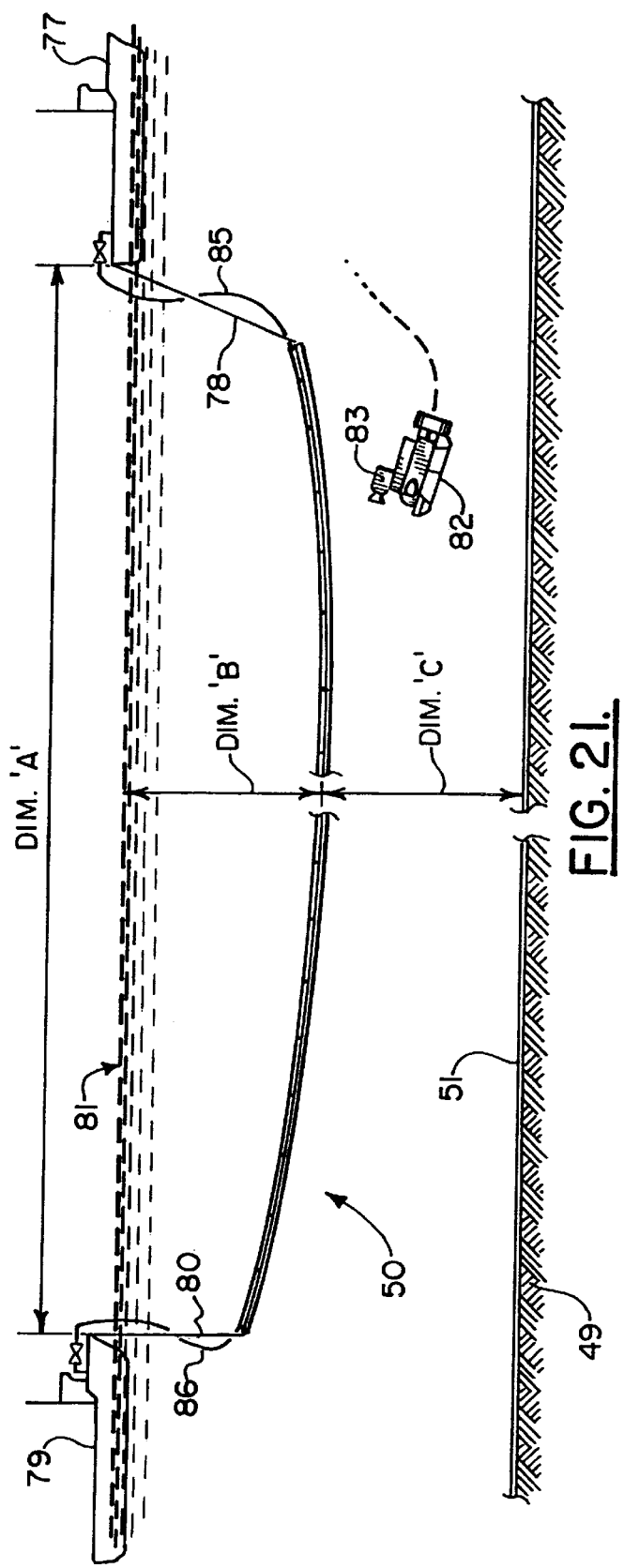
FIG. 21 is a side elevational view illustrating the method of the present invention.

In FIGS. 20–27, the method of the present invention is shown in more detail. The completed pipeline is assembled on beach 76 and pulled into the marine environment using a boat 77 and towline 78 (see FIG. 20). At sea, a pair of boats 77, 79 tow the assembled apparatus 50 to a job site. A towline 78 extends between lead boat 77 and the front of apparatus 50 as shown in FIG. 21. Similarly, a towline 80 connects the rear of the assembled apparatus 50 to a following boat 79. Dimension A designates the spacing between vessels 77, 79.

Dimension B in FIG. 21 indicates the distance between the water's surface 81 and the seabed 49. Dimension C in FIG. 21 indicates the distance between the apparatus 50 and a pipe line 51 resting on seabed 49. These distances can range to the distance from the water's surface a few feet below the water's surface for dimension"B" to the distance from seabed to a few feet above the seabed for dimension"C".

A remotely operated vehicle 82 having camera 83 can be used to position the apparatus 50 directly above pipeline 51. Flowlines 84 and 85 can be used to control ballast fluid as it is transmitted to or from ballast pipe 55. FIG. 23 illustrates the lowering of the apparatus 50 onto pipeline 51 with the aid of remotely operated vehicle 82 and its camera 83.

Figure 26:
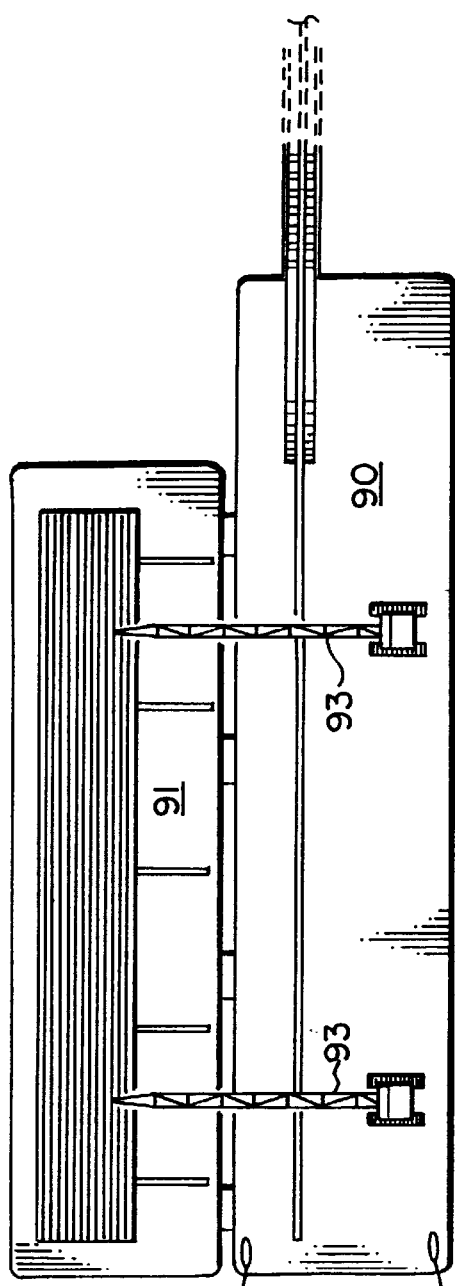
FIG. 26 is a plan view illustrating the method of the present invention.
Figure 25:
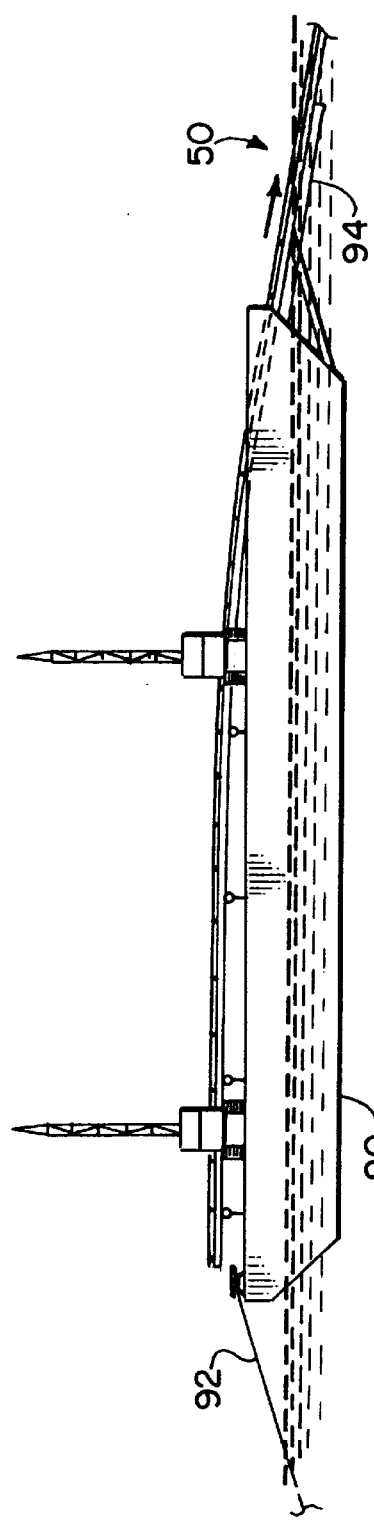
FIG. 25 is a side elevational view illustrating the method of the present invention.

The apparatus 50 of the present invention can alternately be placed upon a submerged pipeline 51 using a lay barge 90. Lay barge 90 is shown in FIGS. 25 and 26 secured to a desired location using anchor lines 92. The apparatus of the present invention can be assembled on deck of the lay barge by pulling sections from supply barge 91 using booms 93. A stinger 94 angles into the water for lowering the apparatus 50 into the ocean.

In FIG. 27, a section of the apparatus 50 is shown with ballast pipe 55 being clamped with clamp members 57, 58 with two frame 53. At the leading end of an assembly of the pipe and insulation apparatus 50 of the present invention, there is provided a cover plate 95 having padeye 96 for forming a connection to either of the tow lines 78 or 80.

The present invention allows for existing deep water pipelines that need additional insulation and/or weight to be insulated without the need for burying or other more costly alternatives to be installed. An optional radiant barrier (not shown) may be added to the I.D. and/or O.D. of the plastic shell lining. Insulation shells 28 can be joined longitudinally by welding, e.g.

The following table lists the parts numbers and parts descriptions as used herein and in the drawings attached hereto.

| PARTS LIST | |
|---|---|
| Part Number | Description |
| 10 | piping assembly |
| 10A | inner pipe assembly |
| 11 | casing |
| 12 | wall |
| 13 | outer surface |
| 14 | inner surface |
| 15 | drag coating |
| 16 | annular containment space |
| 17 | product flow line |
| 18 | flow bore |
| 19 | wall |
| 20 | outer surface |
| 21 | product flow line |
| 22 | insulation layer |
| 23 | outer foil layer |
| 24 | inner foil layer |
| 25 | outer cylindrical surface |
| 26 | spacer body |
| 26A | spacer half |
| 26B | spacer half |
| 27 | outer cylindrical surface |
| 28 | shell insulation member |
| 28A | shell half |
| 28B | shell half |
| 29 | plastic shell |
| 30 | flange |
| 31 | flange |
| 32 | projection |
| 33 | groove |
| 34 | projection |
| 35 | drag surface |
| 36 | foam |
| 37 | weld cap |
| 38 | payeye |
| 39 | arrow |
| 40 | arrow |
| 41 | end |
| 42 | end |
| 43 | mating face |
| 44 | mating face |
| 45 | mating face |
| 46 | mating face |
| 47 | end |
| 48 | end |
| 49 | seabed |
| 50 | pipe and insulation apparatus |
| 51 | pipeline |
| 52 | mudline |
| 53 | frame |

-continued

PARTS LIST

| Part Number | Description |
|---|---|
| 54 | insulation shell |
| 55 | ballast pipe |
| 56 | ballast chamber |
| 57 | clamp |
| 58 | clamp |
| 59 | U-shaped member |
| 60 | side wall |
| 61 | side wall |
| 62 | strut |
| 63 | appendage |
| 64 | transverse plate |
| 65 | diagonal plate |
| 66 | appendage |
| 67 | transverse plate |
| 68 | diagonal plate |
| 69 | pointed edge |
| 70 | pointed edge |
| 71 | curved shell section |
| 72 | curved shell section |
| 73 | flat shell section |
| 74 | flat shell section |
| 75 | stiffener plate |
| 76 | beach |
| 77 | boat |
| 78 | towline |
| 79 | boat |
| 80 | towline |
| 81 | water surface |
| 82 | remotely operated vehicle |
| 83 | camera |
| 84 | flowline |
| 85 | flowline |
| 86 | pig |
| 90 | lay barge |
| 91 | supply barge |
| 92 | anchor line |
| 93 | lifting boom |
| 94 | stinger |
| 95 | cover plate |
| 96 | padeye |
| 97 | end |
| 98 | end |
| S | side boom |
| W | winch |
| C | cable | the foregoing embodiments are presented by way of example only; the scope of the present invention is to be limited only by the following claims.

What is claimed is:

1. A pipe and insulation apparatus comprising:
   a) an elongated pipeline having a flow bore;
   b) a plurality of insulation members that substantially cover the pipeline, each insulation member comprised of a polymeric shell having an internally sealed hollow chamber;
   c) at least a plurality of the sealed chambers being filled with foam;
   d) a ballast member connected to the shell for lowering the shell to the pipeline.

2. The pipe and insulation apparatus of claim 1 wherein the shell is of a high density polymeric material.

3. The pipe and insulation apparatus of claim 1 wherein the shell is polyethylene.

4. The pipe and insulation apparatus of claim 1 wherein the shell is nylon.

5. The pipe and insulation apparatus of claim 1 wherein the shell encapsulates the foam.

6. The pipe and insulation apparatus of claim 1 wherein there are two shell halves that interlock at mating faces at intervals.

7. The pipe and insulation apparatus of claim 1 wherein the shell is comprised of sections that include half sections that abut to encircle the pipeline at intervals.

8. The pipe and insulation apparatus of claim 1 wherein the shell is comprised of shell sections positioned end to end along the pipeline.

9. The pipe and insulation apparatus of claim 1 wherein a plurality of shell sections surround the pipeline circumferentially.

10. A pipe and insulation apparatus comprising:
    a) an elongated pipeline having a flow bore;
    b) a plurality of insulation members that cover the pipeline, each insulation member comprised of a polymeric shell having an internal sealed hollow chamber, the shell having an open bottom that enables the shell to be lowered on to a pipeline resting on a marine seabed
    c) at least a plurality of the sealed chambers being filled with foam;
    d) a ballast member connected to the shell for lowering the shell to the pipeline.

11. The pipe and insulation apparatus of claim 10 further comprising a ballast member attached to the shell.

12. The pipe and insulation apparatus of claim 10 wherein the shell is of a high density polymeric material.

13. The pipe and insulation apparatus of claim 10 wherein the shell is polyethylene.

14. The pipe and insulation apparatus of claim 10 wherein the shell is nylon.

15. The pipe and insulation apparatus of claim 10 wherein the shell encapsulates the foam.

16. The pipe and insulation apparatus of claim 10 further comprising a frame and wherein the insulation members are supported on the frame.

17. The pipe and insulation apparatus of claim 10 wherein the shell is comprised of U-shaped sections that partially encircle the pipeline.

18. The pipe and insulation apparatus of claim 10 wherein the shell is comprised of shell sections positioned end to end along the pipeline.

19. The pipe and insulation apparatus of claim 18 wherein the shell sections interlock with each other end-to-end.

20. A pipe and insulation apparatus comprising:
    a) an elongated pipeline having a flow bore;
    b) a plurality of insulation members that cover the pipeline, each insulation member comprised of a frame and a polymeric shell having an internal sealed hollow chamber, the assembly of frame and shell having an open bottom that enables the shell to be lowered on to a pipeline resting on a marine seabed;
    c) the sealed chamber being filled with foam;
    d) the member connected to the shell for lowering the shell to the pipeline;
    e) the frame and shell having an attached ballast member that enables a user to ballast the shell; and
    f) wherein the frame includes appendages on opposing sides of the shell that can engage the seabed on opposing sides of the pipeline.

21. The pipe and insulation apparatus of claim 20 wherein the shell includes pointed appendages that engage the seabed.

22. The pipe and insulation apparatus of claim 20 wherein the shell is of a high density polymeric material.

23. The pipe and insulation apparatus of claim 20 wherein the shell is polyethylene.

24. The pipe and insulation apparatus of claim 20 wherein the shell is nylon.

25. The pipe and insulation apparatus of claim 20 wherein the shell encapsulates the foam.

26. The pipe and insulation apparatus of claim 20 wherein the shell is comprised of shell sections positioned end to end along the pipeline.

27. A method of insulating an underwater pipeline that rests on a seabed comprising the steps of:
 a) providing a plurality of insulation members, each comprised of a polymeric hollow shell filled with insulation material;
 b) connecting the insulation members end to end;
 c) ballasting the insulation members; and
 d) lowering the insulation members onto the pipeline.

28. The method of claim 27 wherein in step (a) the insulation members are substantially U-shaped in transverse cross section, and further comprising the step of placing the pipeline within the U-shape.

29. The pipe and insulation apparatus of claim 27 wherein the insulation members each include opposed wall sections and further comprising positioning the pipeline between the wall section.

30. The method of claim 27 further comprising the step of transporting the insulation members to the pipeline with one or more marine vessels that two the insulation members in an elongated string.

* * * * *